United States Patent [19]

Koehnlein et al.

[11] Patent Number: 5,283,120
[45] Date of Patent: Feb. 1, 1994

[54] ELECTRIC CABLES WHICH CONTAIN INSULATIONS BASED ON ETHYLENE POLYMERS HAVING HIGH RESISTANCE TO THE FORMATION OF WATER TREES

[76] Inventors: Ernst Koehnlein, 4 Ungsteiner Strasse; Heinz Vogt, 30 Pranckhstrasse; Johannes Schlag, 36 Leuschnerstrasse, all of 6700 Ludwigshafen; Thomas Muehlenbernd, 3 a Siegelsmauer, 6900 Heidelberg; Hans-Henning Hub, 37 Dr.-Illert-Strasse, 6520 Worms, all of Fed. Rep. of Germany

[21] Appl. No.: 400,409

[22] Filed: Aug. 30, 1989

[51] Int. Cl.$^5$ .................... B32B 15/00; D02G 3/00
[52] U.S. Cl. ..................... 428/379; 428/389; 428/375; 525/221; 525/329.6; 174/110 SR; 174/120 SR; 174/110 PM
[58] Field of Search ............... 428/389, 383, 379, 375; 525/919, 209, 221, 329.6; 174/110 PM, 120 SR

[56] References Cited

U.S. PATENT DOCUMENTS

| | | | |
|---|---|---|---|
| 3,404,534 | 10/1968 | Rees | 525/329.6 |
| 3,437,718 | 4/1969 | Rees | 525/221 |
| 4,092,488 | 5/1978 | Hayami et al. | 174/84 R |
| 4,316,783 | 2/1982 | Hosoi | 522/78 |
| 4,690,981 | 9/1987 | Statz | 525/221 |
| 4,804,729 | 2/1989 | Orikasa | 525/331.9 |
| 4,826,726 | 5/1989 | Maeda | 174/110 SR |

Primary Examiner—Patrick J. Ryan
Assistant Examiner—J. M. Gray
Attorney, Agent, or Firm—Keil & Weinkauf

[57] ABSTRACT

An electric cable contains a cable insulation having high resistance to the formation or growth of water trees and having high aging resistance and good processibility and consisting of an ethylene polymer and from 0.5 to 40% by weight of an ethylene copolymer ionomer which contains, in addition to predominant amounts of ethylene, a $C_3$–$C_6$-alkenecarboxylic acid or a $C_4$–$C_6$-alkenedicarboxylic acid or -dicarboxylic anhydride as copolymerized units, some of the carboxyl groups or carboxylic anhydride groups having been converted into ammonium salts of tertiary amines.

4 Claims, No Drawings

ELECTRIC CABLES WHICH CONTAIN INSULATIONS BASED ON ETHYLENE POLYMERS HAVING HIGH RESISTANCE TO THE FORMATION OF WATER TREES

The present invention relates to an electric cable containing a cable insulation having high resistance to the formation or growth of water trees and having high aging resistance and consisting of an ethylene polymer (I) and from 0.5 to 20% by weight, based on the ethylene polymer (I), of an ethylene copolymer (II) which differs from (I) and, in addition to predominant amounts of ethylene, contains a $C_3$–$C_6$-alkenecarboxylic acid or a $C_4$–$C_6$-alkenedicarboxylic acid or $C_4$–$C_6$-dicarboxylic anhydride as copolymerized units and conventional additives in the usual amounts.

In such insulations for electric cables and lines, consisting of ethylene polymers, the simultaneous action of high electric field strengths and moisture may result in the formation of water trees, which must be regarded as a weakening of the insulation and must therefore be avoided by suitable additives.

There are many proposals for avoiding or preventing the danger of water trees, the said proposals relating to the composition or the addition of substances which inhibit the formation of water trees.

For example, DE-A-29 48 492 discloses that polyolefin material intended for cable insulations can be washed with pure water after granulation and directly before extrusion, in order to remove the small amounts of water-soluble and hygroscopic salts which cause the water trees (cf. also DE-A-29 11 756). The disadvantage of this known process is the relatively expensive procedure, since the granules have to be dried with hot air after the washing process.

The addition of water tree inhibitors derived from polymer materials to the polyolefin cable material before its preparation has also been described. For example, the following are recommended in the literature for this purpose: organopolysiloxanes (cf. U.S. Pat. Nos. 4,492,647 and 4,536,530 and EP-A-109 797), polyethylene glycols (cf. EP-A-57 604), epoxy resins (cf. Chem. Abstr. 96:182235), ethylene/1-butene or ethylene/1-hexene copolymers (cf. Chem. Abstr. 101:193825), polypropylene (cf. Chem. Abstr. 102:8329), poly-1-butene (cf. Chem. Abstr. 98:5097), ethylene/vinyl acetate copolymer (cf. Chem. Abstr. 93:169329), polystyrene and triallyl isocyanurate (cf. DD-A-160 808), ethylene/vinyl acetate or ethylene/alkyl acrylate copolymer grafted with styrene (cf. Chem. Abstr. 103:7802), polyvinyl alcohol (cf. Chem. Abstr. 95:204983), chlorosulfonated polyethylene (cf. Chem. Abstr. 95:204981), polyamide (cf. Chem. Abstr. 96:21007), ethylene/ethyl acrylate copolymer (cf. Chem. Abstr. 99:177160) or a styrene copolymer, e.g. styrene/butadiene or styrene/isoprene rubber (cf. Chem. Abstr. 92:7572).

In the known polyolefin cable materials described above, containing added polymeric water tree inhibitors, the effects of, and the effect on, water tree growth are very different, and quantitative information is lacking in most cases. In many cases, the additives have an adverse effect on the homogeneity of the polyolefin cable material and on the aging resistance of the insulation material.

It is also known that stabilized insulation material based on polyolefins and copolymers of ethylene with vinyl acetate can be used against electrical stress, and the polyolefin may consist of an ethylene/alkyl acrylate or ethylene/acrylic acid copolymer (cf. U.S. Pat. No. 4,092,488). Such mixtures of ethylene polymers have the disadvantage that either insufficient resistance to the formation or growth of water trees results or the amount of ester or acid groups has to be chosen so high that the dielectric losses of the materials are increased to an inadmissible extent.

EP-A-0 248 148 describes cable insulations which have high resistance to the formation of water trees and consist of a blend of two ethylene polymers, where one ethylene polymer may be polyethylene and the second polymer is a terpolymer of ethylene, ethyl acrylate and acrylic acid. However, such polyolefin cable materials still have the disadvantage that their mechanical strength is lower and that their adhesion to other, for example conductive, layers of the cable insulation is higher, compared in each case with the materials according to the invention. The latter property in particular complicates handling during the production of connections and links. Furthermore, the content of comonomers in the total mixture must be higher compared with the novel polymers if the desired effect of inhibition of the formation and growth of water trees is to be achieved.

To avoid these disadvantages, European Patent Application 88120670.0 has proposed converting some of the carboxyl groups or carboxylic anhydride groups of the ethylene copolymer (II) of the blend described at the outset into metal salts with metals of group 1 or 2 of the Periodic Table. However, blends of this type still have the disadvantage that the aging resistance is unsatisfactory and that the processibility is inadequate, in particular the flow properties and homogeneity.

It is an object of the present invention to overcome the stated disadvantages and to provide a cable insulation for electric cables which is based on ethylene polymers, has both high resistance to the formation or growth of water trees and low dielectric losses and possesses high aging resistance as well as good processibility.

We have found that this object is achieved by electric cables having cable insulations of the composition described at the outset, the ethylene copolymer (II) being an ionomer in which some of the carboxyl groups or carboxylic anhydride groups have been converted into ammonium salts of tertiary amines.

Preferably, from 2 to 95 mol % of the carboxylic acid copolymerized in the ethylene copolymer ionomer or of the copolymerized carboxylic anhydride are converted into the ammonium salt.

The ammonium salt is particularly preferably formed from tertiary alkylamines or tertiary hydroxyalkylamines.

Electric cables and insulations for electric cables and lines, consisting of ethylene polymers, are well known. It is important that the insulation material has various physical, mechanical and electrical properties to make it suitable for special applications in the cable industry. In the present case, in particular, the resistance to the formation of water trees should be improved to such an extent that, when an ethylene polymer material containing water-soluble salts as technically unavoidable impurities is subjected to a voltage in the presence of water or moisture, the life of the insulation is increased compared with untreated material. Since the admissible conductor temperature is 90° C., the aging resistance, i.e. long-lasting stability to thermal oxidation and deterioration of the mechanical properties, should also be ensured.

For the purposes of the present invention, ethylene polymers (I) are ethylene homopolymers and copolymers which differ from ethylene copolymers (II). Such ethylene polymers are sufficiently well known that further explanation is unnecessary. Particularly suitable ethylene polymers are low density polyethylenes (having a density of less than 0.934 g/cm$^3$ according to DIN 53,479), ethylene copolymers with α-olefins of 3 to 8 carbon atoms, the amount of the said olefins being from 5 to 15% by weight, ethylene/vinyl acetate copolymers, preferably containing from 0.5 to 8% by weight of copolymerized vinyl acetate, ethylene acrylate copolymers, in particular ethylene/ethyl, n-butyl, tert-butyl or ethylhexyl acrylate copolymers, and similar ethylene copolymers except for the ethylene copolymers (II). The ethylene polymers in the uncrosslinked state preferably have melt flow indices of from 0.2 to 10 g/10 min, measured according to ASTM-D 1238-70 at 190° C. and under a load of 2.16 kp, and densities of from 0.890 to 0.934 g/cm$^3$, measured according to DIN 53,479. Instead of the pure ethylene homopolymers or copolymers, blends of different ethylene polymers are also suitable. Such ethylene polymers, their properties and their preparation are described in, for example, Ullmanns Encyclopädie der technischen Chemie, 4th edition, Volume 19, Verlag Chemie GmbH, D-6940 Weinheim, 1980, pages 169–195; Kunststoffe 67 (1977) 118–121, and U.S. Pat. Nos. 3,117,953 and 4,217,431. The ethylene polymers may be crosslinked or uncrosslinked but are preferably 50-90% crosslinked, either by peroxides or by high energy radiation.

The ethylene polymers (I) contain from 0.5 to 40, preferably from 5 to 35, in particular from 10 to 30, % by weight of an ethylene copolymer (I) which differs from (II), the percentages by weight being based on the weight of the ethylene polymer (I). The ethylene copolymer (II) is mixed with the ethylene polymer (I) in a customary mixer by a conventional method.

The blend of ethylene polymer (I) and ethylene copolymer (II) also contains conventional additives in the usual amounts. Conventional additives are, in particular, antioxidants, flameproofing agents, crosslinking assistants, such as triallyl cyanurate, and crosslinking agents, such as organic peroxides, in amounts of from 0.5 to 3.0% by weight, based on the blend.

The ethylene copolymer (II) should be in the form of an ionomer which, in addition to predominant amounts of ethylene, contains a $C_3$-$C_6$-alkenecarboxylic acid or a $C_4$-$C_6$-alkenedicarboxylic acid or a $C_4$-$C_6$-dicarboxylic anhydride as copolymerized units, some of the carboxyl groups or carboxylic anhydride groups having been converted into ammonium salts of tertiary amines. Ethylene copolymer ionomers are known per se and are described in, for example, Ullmanns Encyklopädie der technischen Chemie, 4th edition, Volume 15 (1978), pages 426–428, or in Encyclopedia of Polymer Science and Engineering, 2nd edition, Volume 8, (1987), pages 393–423. In the preparation of the known ionomers, the free carboxyl groups of the ethylene/$C_3$-$C_6$-alkenecarboxylic acid or of the ethylene/$C_4$-$C_6$-alkenedicarboxylic acid or of the ethylene/$C_4$-$C_6$-alkenedicarboxylic anhydride copolymer are reacted with appropriate compounds to give carboxylate groups. The carboxyl-containing ethylene copolymers (II) which are reacted are sufficiently well known that a detailed description is unnecessary (cf. for example EP-A-0 248 148). The ethylene copolymers (II) contain in general from 50 to 90 molar parts of ethylene as copolymerized units.

The starting polymer for the ethylene copolymer ionomer preferably consists of 100 molar parts of copolymerized ethylene, from 1 to 6 molar parts of copolymerized alkene(di)carboxylic acid (anhydride) and from 0 to 5.5 molar parts of copolymerized $C_1$-$C_8$-alkyl ester of a $C_3$-$C_6$-alkenecarboxylic acid.

In particular, acrylic acid or maleic anhydride is copolymerized in the ethylene copolymer ionomer.

A cable insulation in which the ethylene copolymer ionomer has a melt flow index of from 0.2 to 20 g/10 min, measured at 190° C. and under a load of 2.16 kg according to DIN 53,735, is particularly preferred.

Particularly preferably, the unsaturated carboxylic acids or carboxylic anhydrides are graft copolymerized in the ethylene copolymer ionomer.

The special ethylene copolymer ionomers which are to be used according to the invention and in which some of the carboxyl groups or carboxylic anhydride groups of the ethylene copolymer (II) have been converted into ammonium salts of tertiary amines are also well known from the literature (cf. for example U.S. Pat. Nos. 3,404,134, 3,471,460, 3,541,033 or 3,790,521). The ethylene copolymer ionomers are obtained by first preparing a copolymer of ethylene and an α,β-ethylenically unsaturated carboxylic acid, for example according to U.S. Pat. Nos. 3,520,861, 3,201,374 or 3,350,372, and reacting this copolymer with a tertiary amine in a second separate reaction step, for example in an extruder. The ethylene copolymer ionomers can, however, also be prepared directly by copolymerization of ethylene with α,β-unsaturated carboxylic acids or carboxylic anhydrides in a polymerization system under from 500 to 5,000 bar and at from 40 to 350° C. in the presence of a free radical polymerization initiator and of a tertiary organic amine (cf. German Patent Application P 38 30 007.9 of the same rank).

In the ethylene copolymer ionomers, some of the carboxyl groups or carboxylic anhydride groups are in the form of free carboxyl groups or carboxylic anhydride groups while the remainder are bonded to ammonium ions of the tertiary amines. By some of the said groups is usually meant a content of from 2 to 15 mol %.

The starting polymer for the ethylene copolymer ionomer preferably consists of 100 molar parts of copolymerized ethylene, from 1 to 6 molar parts of copolymerized alkene(di)carboxylic acid (anhydride) and from 0 to 5 molar parts of copolymerized $C_1$-$C_8$-alkyl ester of a $C_3$-$C_6$-alkenecarboxylic acid. Such copolymers or terpolymers of ethylene are described in EP-A-0 248 148. Acrylic acid and maleic anhydride are particularly preferred as copolymerized carboxylic acid and copolymerized carboxylic anhydride, respectively.

Preferred electric cables are those which contain a cable insulation material in which from 2 to 95, in particular from 10 to 60, mol % of the carboxylic acid copolymerized in the ethylene copolymer ionomer or of the copolymerized carboxylic anhydride have been converted into the ammonium salt.

A particularly preferred ammonium cation in the ethylene copolymer ionomer is the triethanolammonium or the tri-n-hexylammonium cation. However, tertiary aliphatic amines having a saturated $C_1$-$C_{12}$-hydrocarbon radical, in particular a $C_4$-$C_{10}$-hydrocarbon radical, such as tri-n-butylamine, triisobutylamine, tri-n-octylamine or tri-n-decylamine, and tertiary aliphatic amines having a saturated $C_1$–$C_8$-alkoxyhydrocarbon radical, in particular a $C_2$–$C_6$-alkoxyhydrocarbon radical, such as tributanolamine, triisobutanolamine, tripropanolamine or tri-n-hexanolamine, are also suitable.

It is advantageous if the ethylene copolymer ionomer (II) has a melt flow index of from 0.2 to 20 g/10 min, measured at 190° C. and under a load of 2.16 kg according to DIN 53,735.

Another preferred electric cable is one which contains a cable compound in which, in the ethylene copolymer ionomer, the unsaturated carboxylic acid or the unsaturated carboxylic anhydride is graft copolymerized. Such graft copolymers and their conversion to ethylene copolymer ionomers are disclosed in, for example, U.S. Pat. Nos. 3,264,272 and 3,437,718.

The advantages achievable with the invention are, in particular, that a cable having a cable insulation material based on ethylene polymers is provided, both the formation and growth of water trees being inhibited and low dielectric losses, high aging resistance and good processibility being obtained.

EXAMPLES

Preparation of an Ethylene Copolymer Ionomer

The copolymerization was carried out in every case in a tubular reactor having a length/diameter ratio of about 25,000. To remove the heat of polymerization, the tube walls were cooled with water on the outside. The molecular weight regulator (propionaldehyde) was added to the ethylene/amine/carboxylic acid mixture, and the mixture was compressed to the reaction pressure and fed to the inlet point of the reactor. In addition, a solution of tert-butyl peroxypivalate and tert-butyl perisononanoate in a diluent (gasoline) was added at the inlet point of the reactor.

EXAMPLE 1

5.1 l/h of acrylic acid and 2.7 l/h of tri-n-hexylamine together with 2.3 t/h of ethylene were metered to the suction side of a high pressure compressor, compressed to the reaction pressure of 2,800 bar and heated to 145° C. 1.3 ppm/h of tert-butyl perpivalate and 1.1 ppm/h of tert-butyl perisononanoate, based on the ethylene used, were injected at the inlet point of the tubular reactor and the copolymerization was initiated. The maximum temperature was 250° C. The resulting copolymer ionomer was separated from unconverted ethylene by means of the conventional separation systems and was discharged via a simple KE 150 single-screw extruder from Berstorff. The product was very homogeneous and completely colorless.

EXAMPLE 2

10.2 l/h of acrylic acid and 5.4 l/h of triethanolamine together with 2.3 t/h of ethylene were metered to the suction side of a high pressure compressor, compressed to the reaction pressure of 2,800 bar and heated to 145° C. 1.5 ppm/h of tert-butyl perpivalate and 1.3 ppm/h of tert-butyl perisononanoate, based on the ethylene used, were injected at the inlet point of the tubular reactor and the copolymerization was initiated. The maximum temperature was 250° C. The resulting copolymer ionomer was separated from unconverted ethylene by means of the conventional separation systems and was discharged via a simple KE 150 single-screw extruder from Berstorff. The product was very homogeneous and completely colorless.

COMPARATIVE EXAMPLE A

Low density polyethylene having a melt flow index of 2 g/10 min and a density of 0.918 g/cm$^3$ is mixed with an ionomer consisting of 92% by weight of ethylene and 8% by weight of acrylic acid (AA), 30% of whose carboxyl groups are neutralized with $Zn^{2=}$, so that the mixture contains 0.4% by weight of acrylic acid. The mixture is treated with 0.3% by weight of 4,4'-thiobis-(6-tert- butyl-3-methylphenol) as a heat stabilizer and 1.8% by weight of dicumyl peroxide as a crosslinking agent.

In the water tree test, sodium chloride in the form of small crystals (edge length 10 μm) is finely distributed as a layer in the polyethylene. This is done by dusting the salt onto the uncrosslinked sheet, placing a second such sheet on top and then pressing this sandwich at 200° C. for 10 minutes to a thickness of 1 mm. During this procedure, the polyethylene undergoes crosslinking.

Thereafter, the samples are subjected to 100% atmospheric humidity and a field strength of 2.5 kV/mm.

After the application of electrical stress, the number, the length and the structure of the resulting water trees in the individual samples are determined under an optical microscope. Determination of the number of water trees is carried out in the beam path parallel to the direction of the electric field in which the stress was applied.

The number of water trees formed is related to the number of NaCl crystals and expressed in the table as an amount in % by weight. The length of the water trees is determined on about 0.5 mm thick sections through the sample, the viewing direction being at right angles to the direction of the electric field.

The dielectric losses (tan$\delta$) are determined on 1 mm thick pressed sheets at 23° C. and 80° C. and at a frequency of 60 Hz.

The resistance to aging by thermal oxidation is determined on 1 mm thick crosslinked press sheets. Aging is effected at 150° C. in a through-circulation drying oven. The stability to aging is expressed as a time, in days, after which the material has substantial embrittled areas which can no longer be stretched. To fulfill the relevant standards, insulation materials must still be stretchable after not less than 10 days in the tensile test at room temperature.

The results of the individual tests are summarized in the Table.

COMPARATIVE EXAMPLE B

The procedure described in Comparative Example A is followed, except that up to 30% neutralization is effected with $Na^=$.

EXAMPLE 3

The procedure described in Comparative Example A is followed, except that up to 10% neutralization is effected with tri-n-hexylamine.

EXAMPLE 4

The procedure described in Comparative Example A is followed, except that up to 15% neutralization is carried out with triethanolamine.

| Examples | Mixture, % by weight LDPE | Mixture, % by weight AA | Water tree % after 90 d | Aging stability | tang δ (20° C.) |
|---|---|---|---|---|---|
| A | 99.6 | 0.4[1] | 0 | 4 | 2 |
| B | 99.6 | 0.4[2] | 0 | 3 | 3 |
| 3 | 99.6 | 0.4[3] | 0 | 14 | 2 |
| 4 | 99.6 | 0.4[4] | 0 | 20 | 2 |

LDPE = Low Density Polyethylene
AA = Acrylic acid
[1] = 30% neutralization of AA with $Zn^{2+}$
[2] = 30% neutralization of AA with $Na^+$
[3] = 10% neutralization of AA with tri-n-hexylamine
[4] = 15% neutralization of AA with triethanolamine

We claim:

1. An electric cable containing a cable insulation having high resistance to the formation or growth of water trees and having high aging resistance and consisting essentially of an ethylene polymer (I) selected from the group consisting of ethylene homopolymers or ethylene copolymers with α-olefins of 3 to 8 carbon atoms, ethylene/vinyl acetate copolymers, ethylene acrylate copolymers or mixtures thereof, and from 0.5 to 40% by weight, based on the ethylene polymer (I), of an ethylene copolymer (II) which differs from (I) and contains, in addition to predominant amounts of ethylene, a $C_3$-$C_6$-alkenecarboxylic acid or a $C_4$-$C_6$-alkenedicarboxylic acid or $C_4$-$C_6$-dicarboxylic anhydride as copolymerized units, said ethylene copolymer (II) being an ionomer in which some of the carboxylic groups or carboxylic anhydride groups have been converted into ammonium salts of tertiary amines.

2. An electric cable contain a cable insulation as set forth in claim 1, wherein from 2 to 95 mol % of the carboxylic acid copolymerized in the ethylene copolymer ionomer or of the copolymerized carboxylic anhydride have been converted into the ammonium salt.

3. An electric cable contain a cable insulation as set forth in claim 1, wherein the ammonium salt is formed from a tertiary alkylamine or tertiary hydroxyalkylamine.

4. An electric cable contain a cable insulation as set forth in claim 1, wherein from 10 to 60 moles % of the carboxylic acid copolymerized in the ethylene copolymer ionomer or of the copolymerized carboxylic anhydride have been converted into the ammonium salt.

* * * * *